United States Patent
McClement

(10) Patent No.: US 8,832,274 B2
(45) Date of Patent: Sep. 9, 2014

(54) APPORTIONED QUEUE FOR RESOURCE ALLOCATION

(75) Inventor: Greg McClement, Maple Ridge (CA)

(73) Assignee: Business Objects Software Limited, Dublin (IE)

(*) Notice: Subject to any disclaimer, the term of this patent is extended or adjusted under 35 U.S.C. 154(b) by 0 days.

(21) Appl. No.: 13/416,819

(22) Filed: Mar. 9, 2012

(65) Prior Publication Data

US 2013/0238800 A1 Sep. 12, 2013

(51) Int. Cl.
*G06F 15/173* (2006.01)
(52) U.S. Cl.
USPC ........... 709/226; 709/224; 709/235; 709/239; 709/240; 370/230; 370/230.1; 370/235; 370/252; 370/253; 714/25
(58) Field of Classification Search
USPC .......... 709/224, 226, 235, 239, 240; 370/230, 370/235, 253, 252; 714/25
See application file for complete search history.

(56) References Cited

U.S. PATENT DOCUMENTS

| | | | | |
|---|---|---|---|---|
| 5,903,776 | A * | 5/1999 | Larson ............................ | 710/54 |
| 7,681,087 | B2 | 3/2010 | Simpson et al. | |
| 2002/0065919 | A1* | 5/2002 | Taylor et al. .................. | 709/226 |
| 2003/0016396 | A1* | 1/2003 | Kinoshita ...................... | 358/402 |
| 2003/0046396 | A1* | 3/2003 | Richter et al. ................ | 709/226 |
| 2005/0289395 | A1* | 12/2005 | Katsuyama et al. ............ | 714/25 |
| 2009/0271512 | A1* | 10/2009 | Jorgensen ...................... | 709/224 |
| 2011/0145410 | A1* | 6/2011 | Caldwell et al. .............. | 709/226 |

OTHER PUBLICATIONS

Stefan Xenos, "Priority Queues", Web Document, Created 2002, Updated 2007, Accessed Nov. 23, 2011, http://www.theturingmachine.com/algorithms/heaps.html.

G. Oppenheimer and N. Weizer 1967 "Resource management for a medium scale time sharing operating system" In Proceedings of the first ACM symposium on Operating System Principles (SOSP '67), J. Gosden and B. Randell (Eds.). ACM, New York, NY, USA, 14.1-14.10. DOI=10.1145/800001.811678 http://doi.acm.org/10.1145/800001.811678.

Robert Ronngren and Rassul Ayani, 1997 "A comparative study of parallel and sequential priority queue algorithms" ACM Trans. Model. Comput. Simul. vol. 7, No. 2, pp. 157-209. DOI=10.1145/249204.249205 http://doi.acm.org/10.1145/249204.249205.

(Continued)

*Primary Examiner* — Moustafa M Meky
*Assistant Examiner* — Kidest Mendaye
(74) *Attorney, Agent, or Firm* — Fountainhead Law Group PC

(57) ABSTRACT

An apportioned queue data structure allows a server to specify allocation of resources to return requests according to a prescribed usage request. The data structure comprises an input queue comprising of a set of subqueues (also known as windows). Windows contain requests that will be processed over a fixed window of time. Received items are removed from the input queue and packed into the subqueues according to the service level agreement. These windows (and the elements present within) are then processed in the order of the windows queue (and the order in the window) are arranged. The time for each task is not known until after the request is processed and may be estimated. In a steady state of high load, a queue is created that returns requests tending toward requested percentages of the service level agreement.

12 Claims, 10 Drawing Sheets

(56) References Cited

OTHER PUBLICATIONS

W. M. De Meis and N. Weizer, 1969 "Measurement and analysis of a demand paging Time Sharing System" In Proceedings of the 1969 24th national conference (ACM '69). ACM, New York, NY, USA, 201-216. DOI=10.1145/800195.805933 http://doi.acm.org/10.1145/800195.805933.

Thomas H. Cormen, Charles E. Leiserson, Ronald L. Rivest, and Clifford Stein, 1991 Introduction to Algorithms, MIT Press and McGraw-Hill, ISBN 0-262-03141-8. Section 7.5: Priority queues, pp. 149-151.

\* cited by examiner

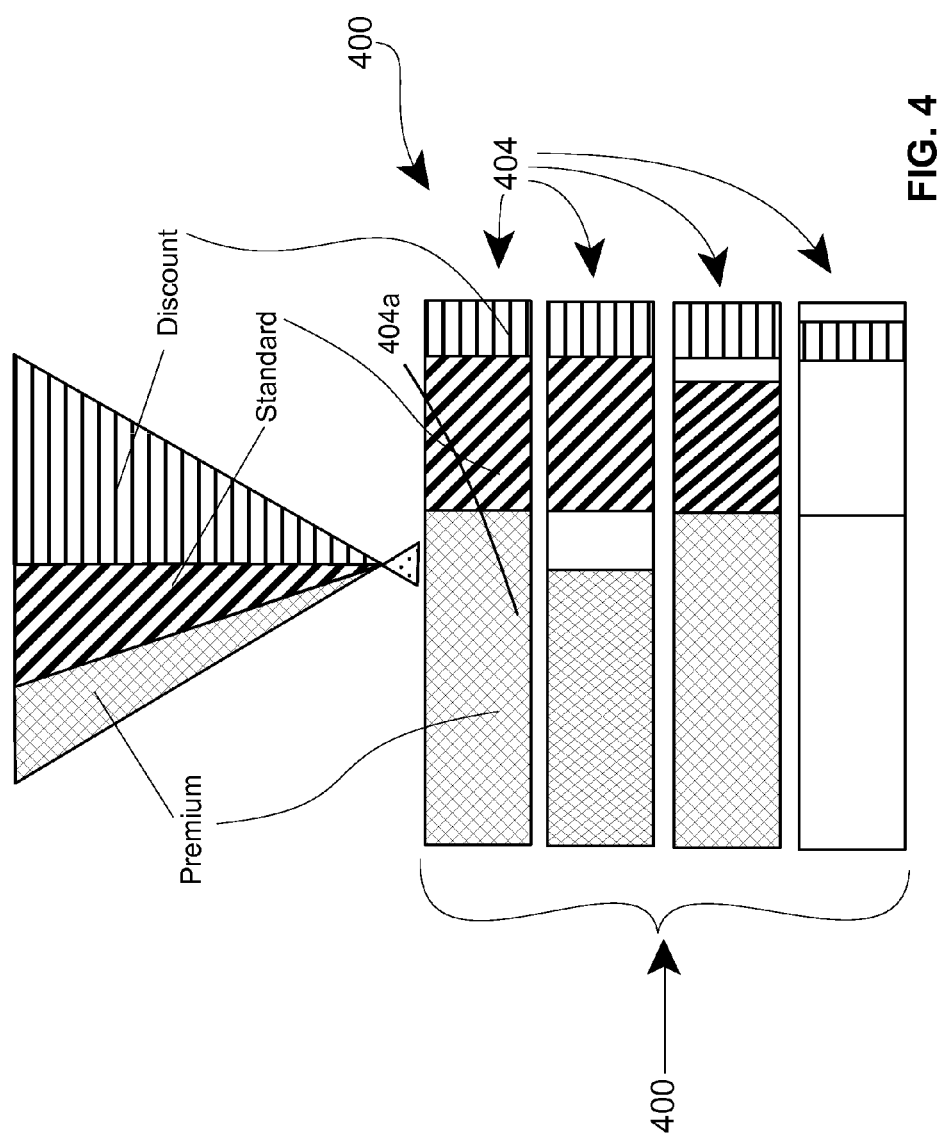

| Tenant | Generated | Time | Requested | Q1 | Q2 | Q3 | Q4 |
|---|---|---|---|---|---|---|---|
| Test1 | | | | | | | |
| premium | 50 | 1 | 50 | 50.835152 | 50.792416 | 49.79565 | 50.092159 |
| normal | 35 | 1 | 35 | 34.549171 | 34.867729 | 35.023876 | 35.035908 |
| discount | 15 | 1 | 15 | 14.615676 | 14.339858 | 15.180471 | 14.871928 |
| Test 2 | | | | | | | |
| premium | 11.111112 | 1 | 50 | 10.909969 | 50.862091 | 49.914379 | 50.387108 |
| normal | 44.444447 | 1 | 35 | 46.721996 | 33.674385 | 34.957222 | 34.897194 |
| discount | 44.444447 | 1 | 15 | 42.368038 | 15.463524 | 15.128398 | 14.715697 |
| Test 3 | | | | | | | |
| premium | 20 | 1 | 66.666672 | 11.347534 | 49.313881 | 65.855721 | 67.047043 |
| discount | 80 | 2 | 33.333336 | 88.652466 | 50.686119 | 34.144279 | 32.952957 |
| Test 4 | | | | | | | |
| premium | 0 | 1 | 0 | 0 | 0 | 0 | 0 |
| discount | 100 | 2 | 33.333336 | 100 | 100 | 100 | 100 |
| Test 5 | | | | | | | |
| premium | 20 | 1 | 50 | 8.645027 | 26.822081 | 48.253624 | 50.153542 |
| normal | 40 | 3 | 35 | 54.933971 | 57.422817 | 36.372707 | 34.406776 |
| discount | 40 | 2 | 15 | 36.421001 | 15.755103 | 15.373668 | 15.439679 |
| Test 6 | | | | | | | |
| premium | 20 | 1 | 50 | 10.082563 | 62.342037 | 76.863358 | 77.255081 |
| normal | 0 | 3 | 0 | 0 | 0 | 0 | 0 |
| discount | 80 | 2 | 15 | 89.917442 | 37.657967 | 23.136644 | 22.744919 |

FIG. 7

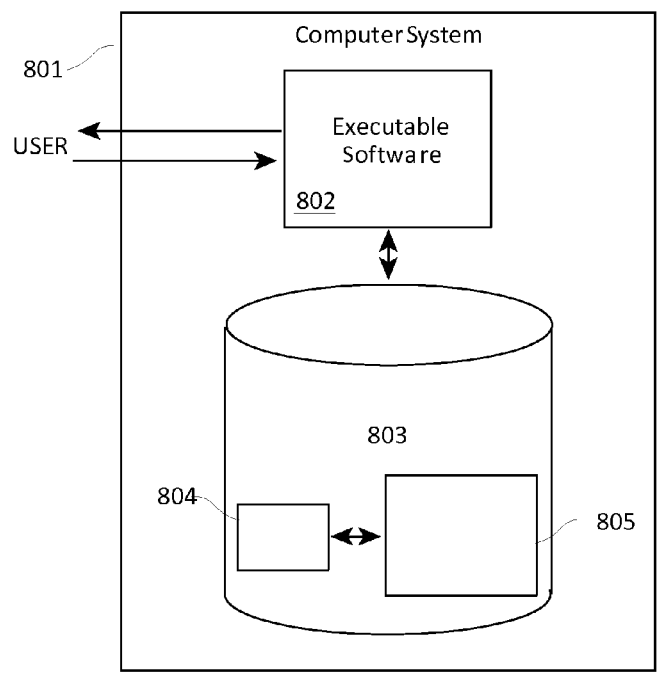
FIG.8
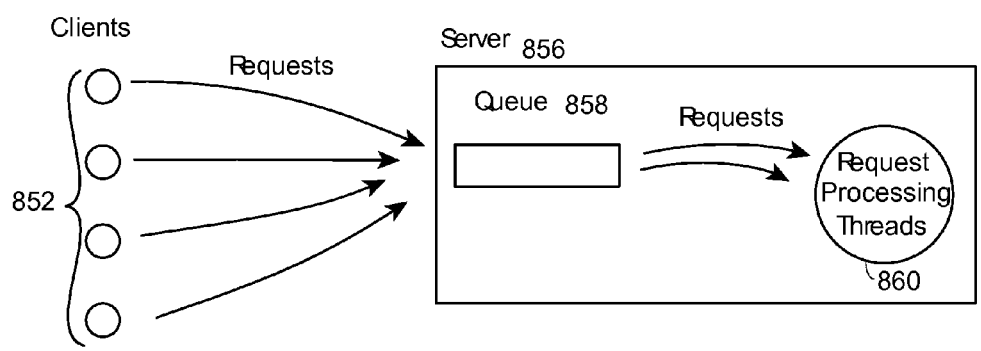
FIG. 8A     850

APPORTIONED QUEUE FOR RESOURCE ALLOCATION

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

INCORPORATION-BY-REFERENCE OF MATERIAL SUBMITTED ON COMPACT DISC

The instant specification includes certain computer code. That computer code is now included in a Computer Program Listing Appendix on one (1) compact disk, the content of which is incorporated by reference herein for all purposes. A duplicate of that one (1) compact disk is also being furnished. This compact disk includes thereon the following files:
Part A, created Jul. 1, 2014 and size 14 KB;
Part 1, created Jul. 1, 2014 and size 17 KB;
Part 2, created Jul. 1, 2014 and size 17 KB;
Part 3, created Jul. 1, 2014 and size 17 KB; and
Part 4, created Jul. 1, 2014 and size 18 KB.

BACKGROUND

The present invention relates to computing, and in particular, to a systems and methods for creating a data structure in which objects may be added and removed according to established procedures.

Unless otherwise indicated herein, the approaches described in this section are not prior art to the claims in this application and are not admitted to be prior art by inclusion in this section.

FIG. 1 is a generic depiction of a conventional server which is configured to respond to a plurality of requests. In particular, a processor 100 of the server receives requests (a, b, c, d) 102 from one more sources ($S_1$, $S_2$, $S_3$, $S_4$) 104. The requests can exhibit some overlap 103 in time (for example requests c and d) or be separated 105 in time (for example requests c and b).

The requests are then packed into a queue 106 according to a queuing procedure 107, and processed in that order by the processor. The results are placed in a result set 108 or are simply returned. For the purposes of FIG. 1 there are no different service levels for the requests.

Typically, the server processes the requests in a queuing procedure according to First-In First-Out (FIFO) principle. Under such a mode of operation, requests are inserted into the queue by the processor in the order they were originally received. Thus, this mode of operation is based exclusively on time, independent of any other criteria, such as, priority, urgency, relative importance, or customer service level.

Increasingly, however, a service is expected to be configured to receive requests and provide responses prioritized according to different levels of service. Examples of such service levels may include free, basic, professional, and premium.

More rapid response times would be expected for correspondingly increasing levels of service. In one implementation a priority number is assigned to a request and the requests of the highest priority are removed from the queue first. However, this can lead to two potential problems.

A first possible problem is starvation. In particular, higher priority requests may dominate the processor and the lower priority requests are neglected.

A second possible problem is a lack of guaranteed level of service. In particular, the lower priority requests could have their services quality go up and down unpredictably and/or drop below a previously agreed upon level when higher level request come in.

Currently, these issues may be addressed by hosting a different cluster per service level. This approach, however, may not result in the efficient utilization of available processing resources. For example, at times where a particular service level is undersubscribed, a cluster may be operating at less than full capacity. As well, additional licensing fees may be owing.

The present disclosure addresses these and other issues with systems and methods allowing server performance (e.g. response time) to be tailored for a particular service level.

SUMMARY

An apportioned queue data structure allows a server to specify allocation of resources to return requests according to a prescribed usage request. The data structure comprises an input queue comprising of a set of subqueues (also known as windows). Windows contain requests that will be processed over a fixed window of time. Received items are removed from the input queue and packed into the subqueues according to the service level agreement. These windows (and the elements present within) are then processed in the order of the windows queue (and the order in the window) are arranged. The time for each task is not known until after the request is processed and may be estimated. In a steady state of high load, a queue is created that returns requests tending toward requested percentages of the service level agreement.

An embodiment of computer-implemented method comprises providing a server configured to receive a plurality of requests, receiving at the server a first request of a first priority type, and receiving at the server a second request of a second priority type. The server is caused to process the first request and the second request in an order according to a queuing procedure based upon a desired percentage of output of the first priority type and of the second priority type as a total number of requests approaches infinity, wherein the desired percentage is based upon a service level agreement.

An embodiment of a non-transitory computer readable storage medium embodies a computer program for performing a method, said method comprising causing a server to receive a first request of a first priority type, and causing the server to receive a second request of a second priority type. The server is caused to process the first request and the second request in an order according to a queuing procedure based upon a desired percentage of output of the first priority type and of the second priority type as a total number of requests approaches infinity, wherein the desired percentage is based upon a service level agreement.

An embodiment of a computer system comprises one or more processors, and a software program, executable on said computer system. The software program is configured to cause a server to receive a first request of a first priority type, cause the server to receive a second request of a second priority type, and cause the server to process the first request and the second request in an order according to a queuing procedure based upon a desired percentage of output of the first priority type and of the second priority type as a total number of requests approaches infinity, wherein the desired percentage is based upon a service level agreement.

In some embodiments, the queuing procedure creates a window comprising a first number of slots apportioned for processing requests of the first priority type, and comprising a second number of slots apportioned for processing requests of the second priority type.

Certain embodiments further comprise scaling a slot size based upon an estimated time of processing a request of the first priority type or of the second priority type.

According to particular embodiments, the estimated time is based upon an actual processing time of a previous request received by the server.

Some embodiments further comprise calculating an error adjustment value derived from comparing an actual percentage of previous responses to the desired percentage, wherein the scaling comprises adding the error adjustment value to the slot size.

Particular embodiments further comprise processing a server-to-sever request as a super-priority item in a next available window.

According to one embodiment, a computer-implemented method comprises providing a server configured to receive a plurality of requests, receiving at the server a first request of a first priority type, and receiving at the server a second request of a second priority type. Request processing threads are caused to respond to the first request and to the second request in an order according to a queuing procedure based upon a desired percentage of output of the first priority type and of the second priority type, the desired percentage based upon a service level agreement.

The following detailed description and accompanying drawings provide a better understanding of the nature and advantages of the present invention.

BRIEF DESCRIPTION OF THE DRAWINGS

FIG. 4 shows a first embodiment of a queuing procedure.

FIG. 7 is a table presenting statistics on queue model performance.

FIG. 8 illustrates hardware of a special purpose computing machine configured to implement resource allocation according to an embodiment.

FIG. 8A illustrates an overview of the elements of an embodiment of a queue system according to an embodiment.

DETAILED DESCRIPTION

Figure 1:
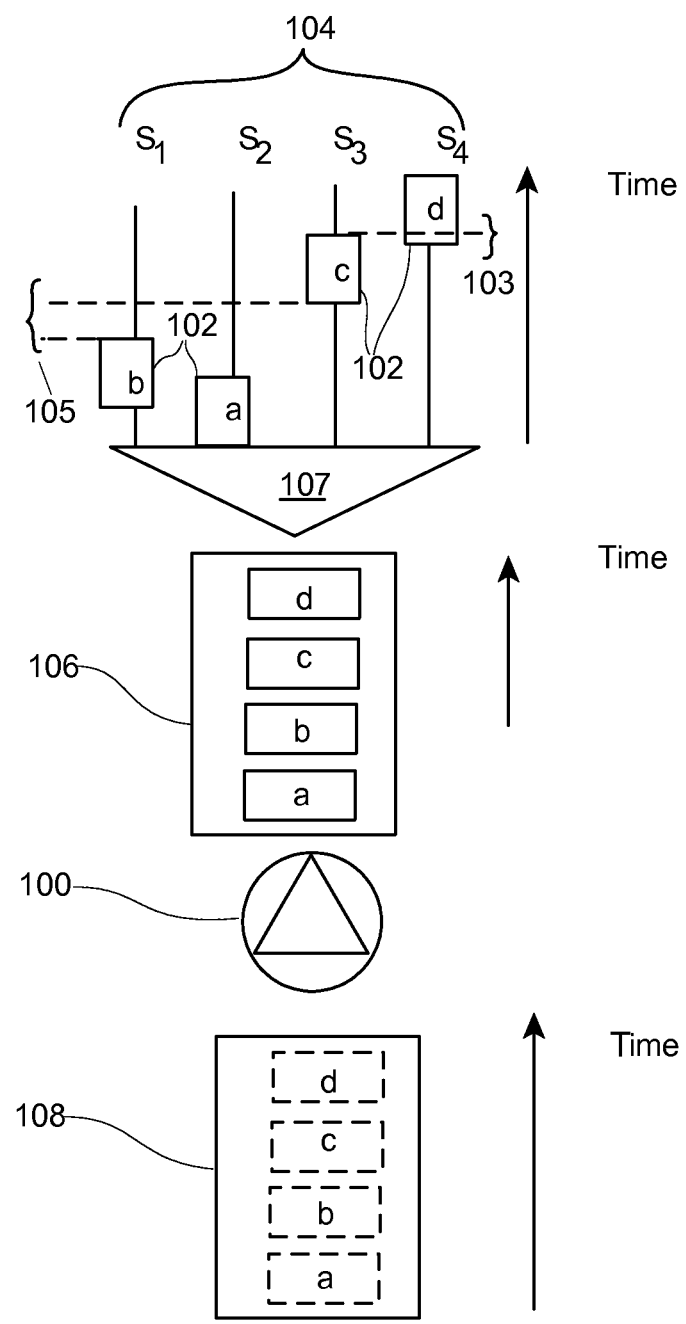
FIG. 1 is a generic depiction of a conventional server configured to respond to a plurality of requests according to a FIFO procedure.

The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, examples and specific details are set forth in order to provide a thorough understanding of various embodiments of the present invention. It will be evident, however, to one skilled in the art that the present invention as defined by the claims may include some or all of the features in these examples alone or in combination with other features described below, and may further include modifications and equivalents of the features and concepts described herein.

Embodiments allow a single cluster to respond to a plurality of service levels by making use of an apportioned queue for one or more of the servers in the cluster. The users under different service levels will be have different response experience based on the resource allocation specified in the system. Allocation of resources is done by allocating time to process requests for each service level.

An apportioned queue data structure comprises an input queue comprising a set of subqueues known herein as "windows". These subqueues are referenced as windows because a subqueue corresponds to a window of time over which the number of requests processed should tend to be closest to the requested percentages in the service level agreement.

According to certain embodiments, items are removed from the input queue and packed into the windows per a service level agreement. These windows (and thus the elements in them) are then processed in order of windows queue (and order in the window).

An amount of time assumed for each task is estimated. Depending upon the particular embodiment of the queuing procedure utilized for resource allocation, the accuracy of the estimated time can vary.

In the steady state of high load, the packing of the windows tends on average to the guaranteed service levels according to the server level agreement. In particular, a queue is created such that when the system is saturated, as time goes to infinity the time spent processing requests will tend toward the requested percentages.

For example, a system may recognize three levels of priority for server requests: "Discount" (lowest priority), "Standard" (higher priority), and "Premium" (highest priority). If the system can process ten (10) requests per hour, and fifty (50) discount requests, thirty (30) premium requests, and twenty (20) standard requests are received at the same time, according to the terms of the service level agreement, after an hour the system may have processed six (6) premium, three (3) standard, and one (1) discount request.

The above example is simplified, in that it assumes each request takes the same amount of time to process. However, as described below, depending upon the particular embodiment the queuing procedure is not required to make this assumption.

The queues described here adjust the order that requests are returned so that the final effect is that the resource allocation matches the requested percentages. In order to understand the queuing behavior, the properties are first described and then particular queuing procedures are presented.

Inputs, helper functions, data structures, and outputs of an embodiment of the queuing procedure are now described. Examples of inputs are as follows.

| Symbol | Definition | Example |
|---|---|---|
| C | C category is a map from type name to usage weight. This is one definition of set of service levels. | { "premium" => 30, "standard" => 15, "discount" => 5 } |
| I | I is a series of requests, potentially infinite, such that each request has a processing time and a category. The processing time is not known until after the request is processed | {r1, r2, ... } |

Examples of helper functions are as follows.

| Symbol | Definition | Example |
|---|---|---|
| P(F) | F is a function from values to numbers. P is a function that maps functions such as F to a new function that contains categories and percentages. | F = { "premium" => 30, "standard" => 15, "discount" => 5 } then P(F) { "premium" => 30/50, = "standard" => 15/50, "discount" => 5/50 }. |
| P(F)(a) | P is a function that maps functions such as F and category a to a percentage. | P(F)(a) = F(a)/sum(range(F)) |
| domain(F) | Assume F is a function. Then domain(F) is a list of all elements that F maps from. | if F = { "premium" => 30, "standard" => 15, "discount" => 5 } then domain(F) is {"premium", "standard", "discount"} |
| range(F) | Assume F is a function. Then range(F) is a list of all elements that F maps to. | if F = { "premium" => 30, "standard" => 15, "discount" => 5 } then range(F) is {30, 15, 5} |
| sum(L) | Assume L is a list of numbers. Then sum(L) is the sum of the numbers in the list L. | if L = {30, 15, 5} then sum(L) is 50. |
| project(F,S) | F is a function. S is a set. Project(F,S) is a subset of F such for each element, e in S and domain(F) then project(F,S) contains e=>F(e). | if F = { "premium" => 30, "standard" => 15, "discount" => 5 } and S = { "premium", "discount" } then project(F, S) = { "premium" => 30, "discount" => 5 } |

Examples of data structures are as follows.

| Symbol | Definition |
|---|---|
| Q | A queue |

Examples of outputs are as follows.

| Symbol | Definition |
|---|---|
| O | sequence of requests that have been processed |

Usage of the queuing procedure is now described. Requests are taken from series I and put in queue Q, and then removed from queue Q and appended to sequence O. The time to process a request is not known until it is removed from queue Q and is not put back in queue Q.

Queuing systems according to various embodiments can be understood with reference to their properties.

A first possible property of the system is saturated. The system is saturated when requests cannot be processed as fast as they arrive, and each category of request has more requests than can be processed.

Under the saturated condition, the category map C will be used to determine the request processing order in queue Q. When the system is saturated, it is desired to have sequence O have the following properties:

1. Assume O(i) is the ith request in sequence of requests O.

2. Assume N(i) is a map from range(C) to an integer. N(i)(c) is the number of requests in sequence O with category c and position in the sequence less than or equal to integer i. That is N(i)(c) is a count.

3. Assume T(i) is a map from range(C) to real numbers. T(i)(c) is the total processing time of requests in sequence O with category c and position in the sequence less than or equal to integer i. As integer i tends to infinity for all categories, c, the service levels tend to prescribed values.

as i→infinity for all categories, c

P(T(i))(c) approaches P(C(c)).

That is, the time for each category c the time spent processing each category divided by the sum over all these times approaches the values prescribed for category c.

Thus considering all categories of request types, as a number of total requests approaches infinity, the percentage of the map output approaches the percentage of the category map. As the environment is zero sum, some of the categories will start out lower and approach and some will be higher. This situation can also be inverted. However, all categories would not be higher or all categories lower, unless there is zero or one categories. In this manner, the percentage for each category in the output sequence approaches the requested percentage.

Figure 2:
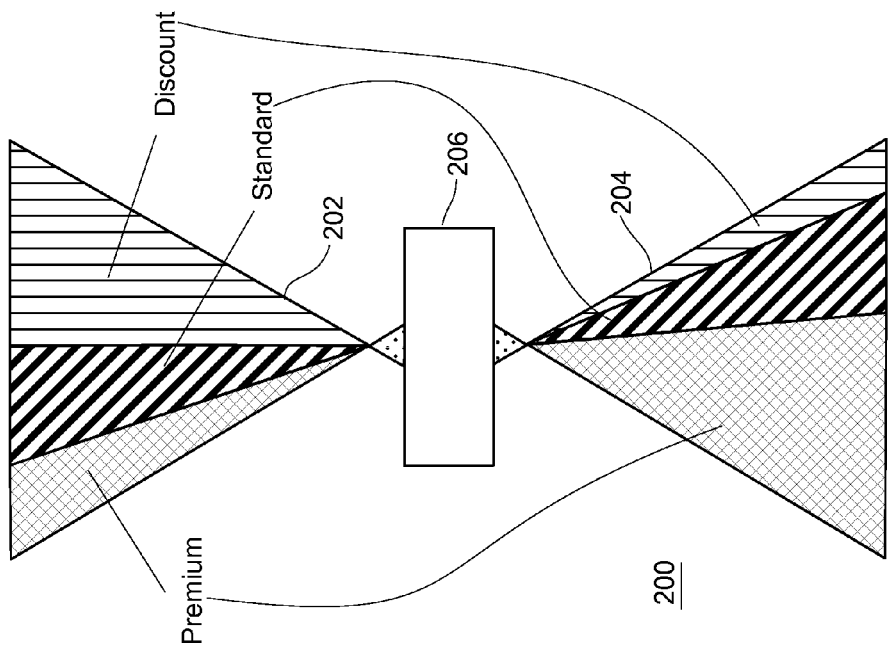
FIG. 2 illustrates a saturated property.

FIG. 2 is a simplified diagram showing a saturated condition 200. The input percentages are represented by areas in the upper triangle 202. The output percentages are represented by areas in the lower triangle 204. The middle box 206 represents the queue.

A second possible property of the system is semi-saturated. The system is semi-saturated when requests cannot be processed as fast as they arrive. Either a category of requests has more requests than can be processed, or there are no requests in that category.

| Symbol | Definition |
| --- | --- |
| E | is the set of all categories that have requests |
| C' | equals project(C, E) |

As integer i tends to infinity the number of elements of the sequence O tends to infinity. For all categories, c, the service levels tend to prescribed values. That is, as i→infinity for all categories, c P(T(i))(c) approaches P(C'(c))

Thus considering all categories of request types, as a total number of requests approaches infinity, the percentage of the map output approaches the percentage of the category map for a particular project. In this manner, the percentage for each category in the output sequence approaches the requested percentage for that project.

This may be illustrated with reference to an example. Assume C is:

C={"premium"=>30, "standard"=>15, "discount"=>5};

P(C)={"premium"=>30/50, "standard"=>15/50, "discount"=>5/50};

However, there are no standard requests.

Then, the system uses the category map C' to allocate resources:

C'={"premium"=>30, "discount"=>5};

P(C')={"premium"=>30/35, "discount"=>5/35};

The purpose of this is to split the "unused" percentage according to the original weight, instead of splitting it evenly.

Figure 3:
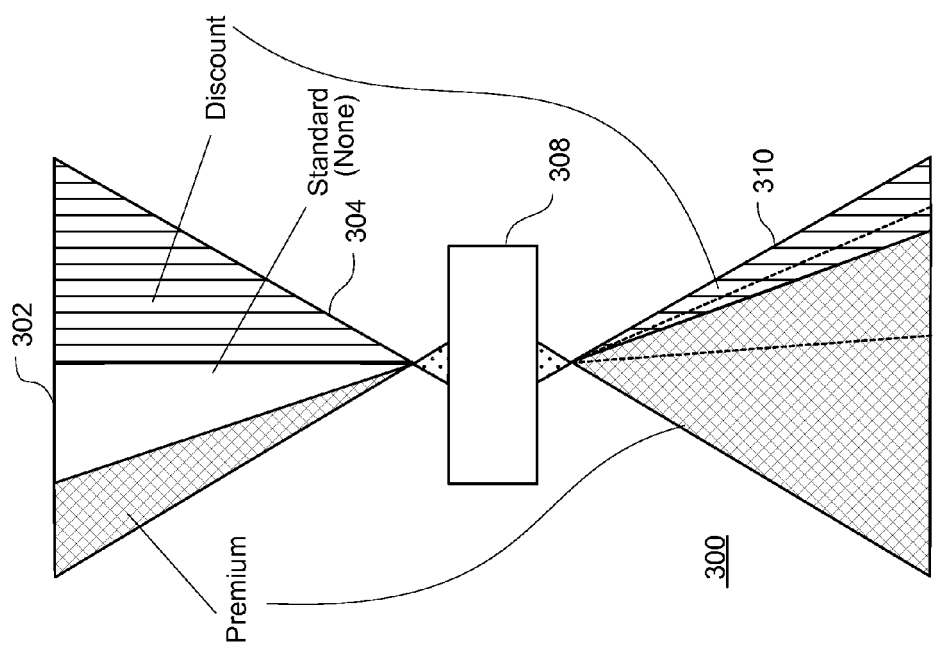
FIG. 3 illustrates a semi-saturated property.

FIG. 3 illustrates the semi-saturated property 300. The upper triangle 304 represents the input requests. The open area 302 in the upper triangle 304 indicates no requests in that particular category (here "Standard"). The hatched areas represent the amount of time for processing various request types. The queue is represented by the rectangle 308 in the middle. The lower triangle 310 represents the amount of time actually spent on requests after being processed by the queue.

FIGS. 2 and 3 may be compared as follows. FIG. 2 shows although the input number of requests have some proportion after the requests are pulled out of the queue, that proportion of requests processed changes into the user-specified percentages. For example, it could be 10 percent of the requests are premium, 50 percent are standard, and 40 percent are discount. By using embodiments of queue allocation to process the request, the requests processed will match the user-specified percentages. This is because the queue allocation changes the order in which the requests are processed.

For FIG. 3, the blank color for the standard category indicates that there are no requests in that category. The dashed lines in the bottom triangle shows that the queue system splits between the premium and discount requests, the slice that was previously allocated to the standard request. This split is proportional to the overall user-specified percentages.

Three different embodiments of the queuing procedure are now described below, in order of increasing complexity. Each embodiment builds upon the previous one, enhancing its performance.

Part 1 of the APPENDIX lists source code which may be common to all three embodiments, in a C++ implementation.

A first embodiment of the queuing procedure 400 is shown in FIG. 4. In particular, this embodiment comprises a queue 402 of windows 404, where "window" is used in the sense of a window of time.

Each window 404 is a queue that only holds a fixed number of requests of each type. The number of requests is proportional to the requested percentages. For example, if the requested percentages are 60% for premium users, 30% for standard users and 10% for discount users then a window allocated could be six (6) spaces for premium users, three (3) spaces for standard users, and one (1) space for discount users. This particular allocation is shown in the window 404a.

The queuing procedure of the first embodiment has options for controlling the final values. However, the proportions will match the requested percentages. In some embodiments, each window has a map from category to count. That map is initialized as has been described previously. In certain embodiments counts are implemented as integers.

The basic procedure for inserting an item (I) in category (C) on the queue (Q), is as follows:

1. For each window W in queue Q starting from the start of the queue
   a. If the counter for category C in W is greater than zero
      i. Put item I in window W.
      ii. Decrement the counter for category C
      iii. Done insertion
2. If the item was not inserted. Make a new window W. Set the counter map as described previously. Proceed per (1).

Figure 10:
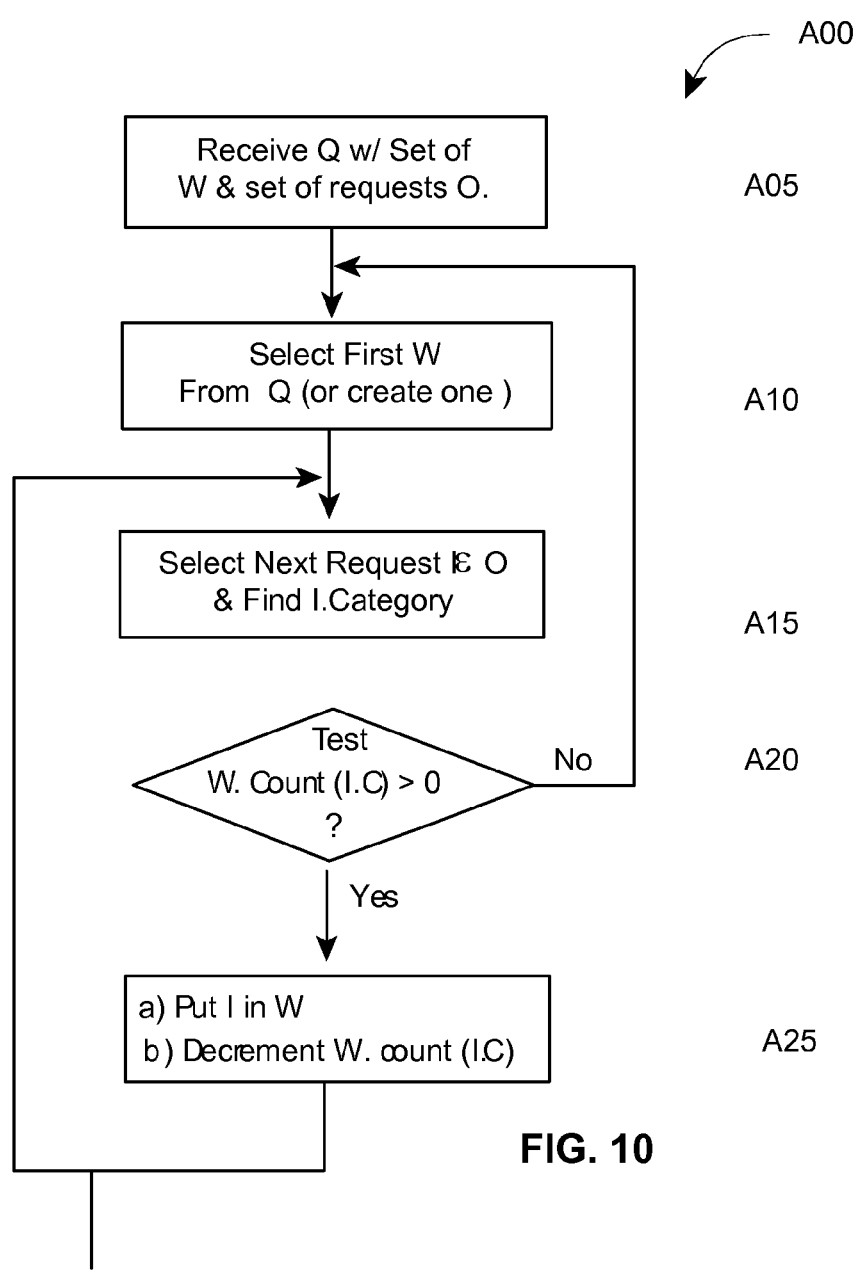
FIG. 10 is a simplified flow chart showing an embodiment of the basic procedure.

An embodiment of the basic procedure is shown a method A00 in FIG. 10. At operation A05 a queue Q including a set of windows, and a set of requests O are received.

Next at operation A10, a first window W is selected form the set of windows in queue Q. If there is no first window, one is created.

Next, a request is selected from the set of requests O and the category of the request is found. That is, at operation A15 the item is removed from the set of requests and a look-up or a look within it finds its category—standard, discount, and the like.

At A20, it is tested whether the window's count for the category is greater than zero. That is, is there room in the window? If A20-Yes, then the request is added to the window and the corresponding count is decremented at the same time.

Processing continues at A15 with the next request. If A20-No, then loop back to operation A10 selecting or creating a new window for the item. Creating a new window includes defining a set of counts for the categories associated with the window.

The basic procedure for removing an item, is to remove the item from the first window in the queue. The window is itself a queue, and operates in the manner of a generic FIFO queue. If the window is empty, it is removed from the apportioned queue.

Figure 11:
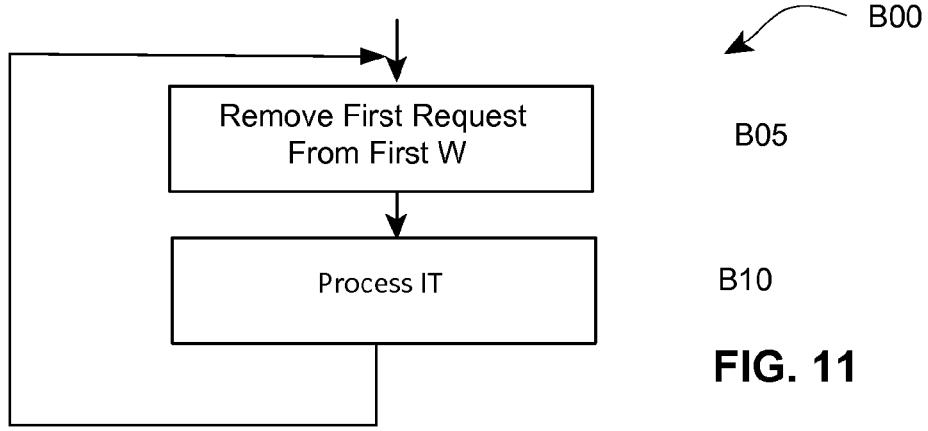
FIG. 11 is a simplified flow chart illustrating an example of selecting and processing items from a window in a queue according to an embodiment.

FIG. 11 illustrates an example of selecting and processing items from a window in a queue. Variation to process B00 is possible, for example, adding further processing operations.

At operation BL05 a request is removed from the first position in the first window of the queue. This removal can happen concurrently subject to locking of the windows as it is processed by process A00.

The processor (e.g., processor 100) then processes the request—B10. In some embodiments, there can be two or more processors.

A source code implementation of processes A00 and B00 is found in Part 1 of the APPENDIX. Processes A00 and B00 can be implemented with concurrency on the data structures with appropriate locking and unlocking for each addition and removal.

Although a few variations have been described in above, other modifications are possible. For example, the logic flow depicted in the accompanying figures and described herein does not require the particular order shown, or sequential order, to achieve desirable results. As well, additional processing operations may be inserted.

Part 2 of the APPENDIX lists source code for a version of the first embodiment in a C++ implementation.

In the first embodiment, the queue satisfies the saturated and semi-saturated properties mentioned before, but only for the case that requests of different categories take a same amount of time. However this may not be the case in real world situations. For example the members of the different categories may do different work, and/or in the short term the work load may be different.

The rate at which the actual workload converges to the requested workload, may thus be a factor to be considered. Accordingly, the second embodiment of the queuing procedure improves upon the first embodiment by recording an actual amount of time spent processing requests. This value is then used to adjust the size of the windows for each category.

The basic queuing procedure of the second embodiment is the same as the first embodiment, with certain refinements. These refinements have the effect of adjusting the sizes of the slots of the windows by scaling, depending upon an estimated time of processing.

In particular as requests are processed, an amount of time processing a request per category is accumulated. After creating a new window based on the requested percentages, the size for each category can be adjusted based on the actual processing percentages from the previous window of requests.

The actual percentages are compared to the requested percentages, and this produces an adjustment percentage. The adjustment percentage can then be used to adjust the number of slots for each category in the current window. This can be performed using a multiplication.

Figure 5:
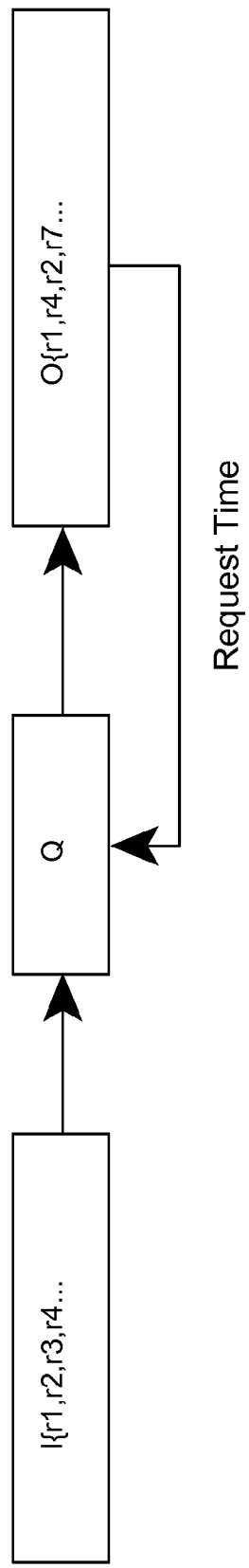
FIG. 5 illustrates a feedback loop where the time spent processing the request is fed back.

FIG. 5 illustrates the feedback loop where the time spent processing the request is given back to the Q queuing procedure. This information is used to adjust the window sizes based on the actual "size" (in terms of estimated processing time) of the requests.

The approach of FIG. 5 reflects the reality that the actual time required to process a request, is not known by the queue system until after the request has been processed. If the queue system knew in advance how long a request would take to actually process a request, it could reorder the requests in the most efficient manner. However, such advance knowledge of actual request processing time is generally not available.

Figure 6:
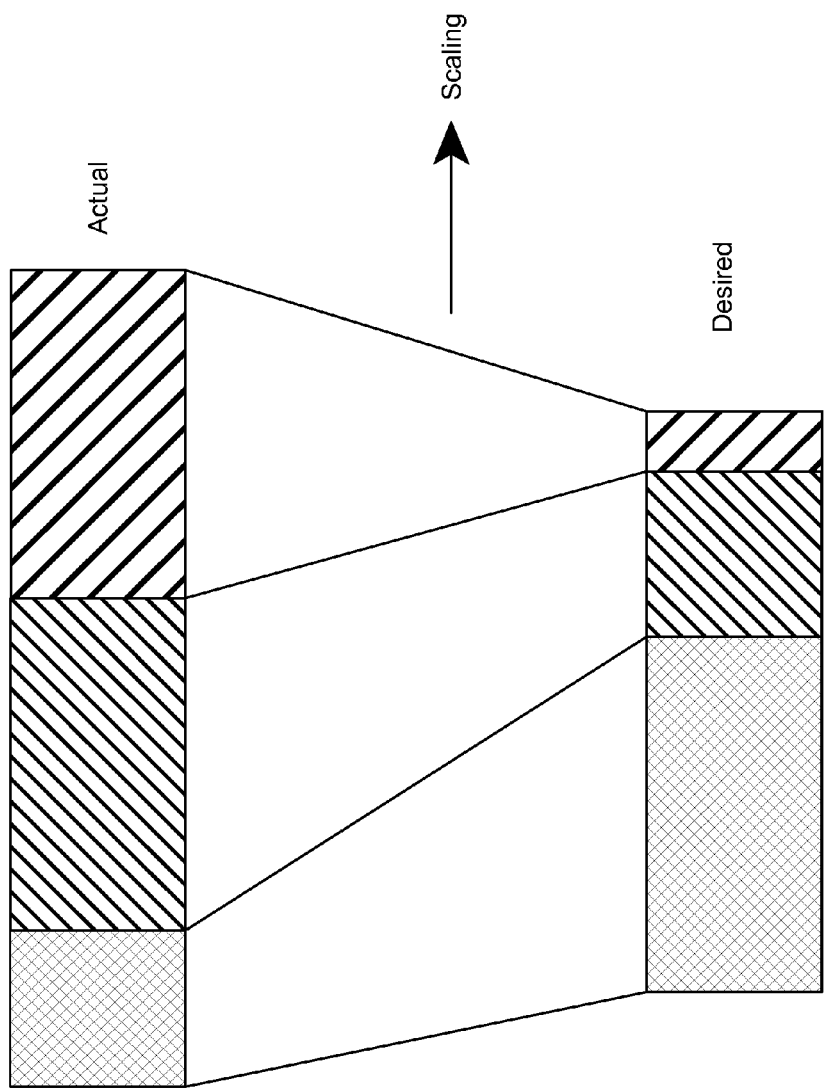
FIG. 6 illustrates scaling of a number of slots based upon a size of actual requests.

FIG. 6 illustrates how the number of slots can be scaled based on the "size" of the actual requests. An example of this scaling can be understood in the case of three categories: "Premium", "Standard", and "Discount". Each of the categories is scaled in FIG. 6.

Assume the requested percentages are 80% for premium requests, and 20% for discount requests. Assume also that the discount requests take two times as long as the premium requests.

Using the queuing procedure of the first embodiment, each window would have eight (8) slots for premium requests, and two (2) slots for discount requests.

In contrast, by utilizing the scaling feature of the second embodiment, the number of slots could be adjusted based on the actual times. For this example, discount requests would take twice as long as premium requests. The requests would thus be scaled so that the window contains sixteen (16) slots for premium requests and two (2) slots for discount requests. This would account for the difference in processing times.

Part 3 of the APPENDIX lists source code for a version of the second embodiment in a C++ implementation. Details of this embodiment (as implemented in C++) are shown in the "class Scaler3" and the function Scaler3::update.

The second embodiment of the queuing procedure performs well as seen in the measurements in the table of FIG. 7 discussed below. Not evident from that table, however, is the rate at which the actual percentages converge to the requested percentages.

In particular, the second embodiment does not converge rapidly to the requested percentages. Rather, it is affected by variations in the rate at which requests arrive, and how long the requests take to process.

Specifically, the second queuing procedure embodiment works by predicting the future performance based on past performance. This prediction can be somewhat inaccurate, as work load characteristics vary.

Another possible source of inaccuracy is that an entire request needs to be processed or not processed, when in fact the calculations might require that part of a request be processed in order to match the desired time allocation. Partial processing of a request is not performed.

Accordingly, a third version of the queuing procedure accounts for this issue by calculating an error adjustment. This error adjustment is derived from comparing the actual percentage to the desired percentage.

This comparison yields an error value reflecting the magnitude of deviation of the previous actual percentage from the desired actual percentage. This amount of error is added to the slot sizes. The effect of this adjustment is to account for the past prediction error in the next window times.

Part 4 of the APPENDIX lists source code for a version of the third embodiment in a C++ implementation.

The implementation of the adjustment (in C++) made by the third embodiment of the procedure, can be seen in 'class Scaler4' in Part VII. The 'update' member calculates the errors. The 'adjust' member adjusts the window size using the method of the second embodiment (multiply) and the error adjustment of the third embodiment (addition).

It is noted that the ScaledQueue is used in both the second and third embodiments of queuing procedures. The Scaler template argument selects which embodiment to use.

The performance of the third embodiment is also reflected in the table of FIG. 7. In particular, the convergence appears to be marginally better than in the second embodiment.

Figure 7A:
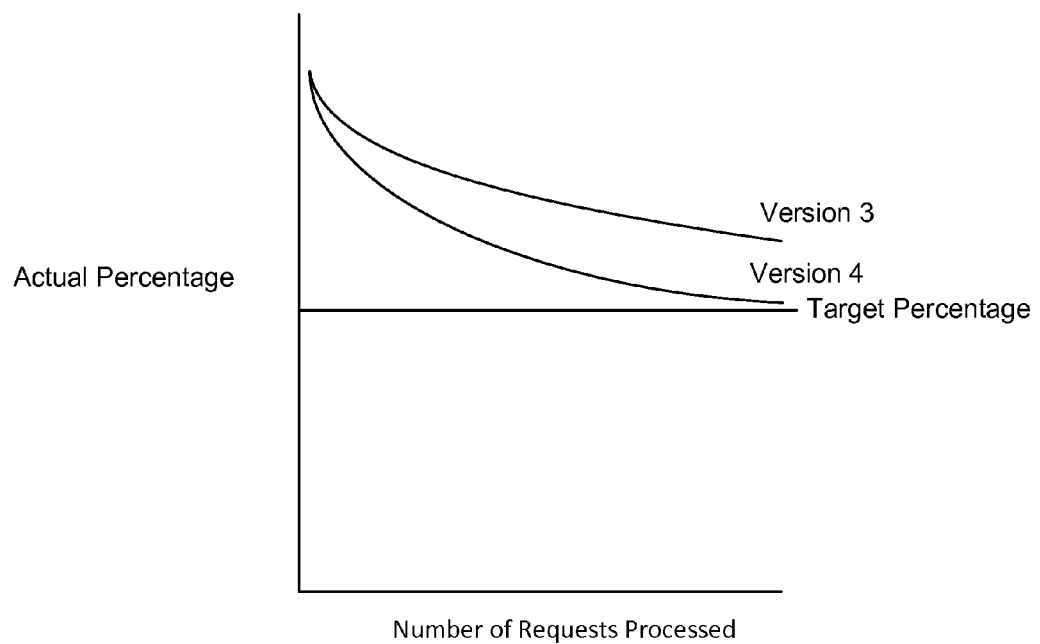
FIG. 7A is plots percentage of requests processed versus number of requests received, for the second and third embodiments.

However, when the raw data for the third embodiment is graphed in FIG. 7A, the convergence rate is much faster. This indicates an enhanced ability of the third embodiment to handle load variations in a real system.

While the invention has been described above in conjunction with certain particular embodiments, it is not limited to those embodiments. For example in some embodiments server-to-sever requests can be added as a super-priority item to be processed in FIFO manner in the next available window.

For example, in some instances certain server-to-server requests may be made to the whole system, rather than for a particular category of client. In certain embodiments such requests may be processed using the FIFO model. Embodiments thus may support both categorized requests and standard FIFO requests.

The following examples describe resource allocation according to various embodiments.

Example 1

SAP® offers for sale a Business Objects Intelligence Platform, also known as the Business Objects Enterprise (BOE). The following example relates to a queue model implemented on the BOE platform, utilizing an EBUS, as is available from SAP AG of Walldorf, Germany. The server may be configured as follows.

A function allows specification of the map from category name to a weight of how much time to allocate to that category. The default category argument specifies which category to use when the client does not specify a category.

The function specification is as follows.

typedef CORBA_Float Weight;

typedef std::map<std::string, Weight> CategoriesToWeight;

static void CORBA_BOA::set_categories(const CategoriesToWeight &, const std::string &defaultCategory);

The client may be configured as follows. The category of the client is specified using the request context used by the interceptors. The following function can be used to add the category to the request context from within an interceptor.

static void CORBA_BOA::initialize_category_context (const std::string &category, IOP_ServiceContext &sc);

In use of the apportioned queue, the server program arguments may specify the weights for each category. For example, "server discount 1 premium 3" specifies that 75% of the requests will be premium and 25% will be discount, when the system is saturated.

With no arguments, the server is running in normal threaded mode.

Once the server is started the client can be run. The arguments are (<category> <nThreads> <requestTime>)+. <category> is the name of the category. <nThreads> are the number of threads to make for that category. Using <requestTime>, the client will call a function that this argument is passed to.

On the server the thread will sleep <requestTime> milliseconds. For example, "client discount 20 500 premium 8 500", runs the client with 20 discount threads and 8 premium threads. Threads will sleep for 500 ms on the server.

The client can be stopped manually, for example by typing 'x'. Then statistics will be printed.

Example 1A

The server is started in this way to get the normal thread pool with 5 threads.

$ ./server

This is a run when the server is running with no arguments in normal threaded mode. N is the number of calls made by the threads. N % is the overall percent of N. In this case 68% of the calls were discount and 31% were premium. This roughly corresponds to the number of threads.

$ ./client discount 20 500 premium 8 500
Enter 'x' for exit:

| | > x | | |
|---|---|---|---|
| Category | N | N % | NThreads |
| discount | 86 | 68.25 | 20 |
| premium | 40 | 31.75 | 8 |

Example 1B

For the next example, the server is started as follows:
$ ./server discount 1 premium 3
The server is ready When the client is run again with the same parameters, the request processing has changed. In this case the number of requests processed is proportional to the request proportions on the server.
$ ./client discount 20 500 premium 8 500
Enter 'x' for exit:

| | > x | | |
|---|---|---|---|
| Category | N | N % | NThreads |
| discount | 63 | 26.03 | 20 |
| premium | 179 | 73.97 | 8 |

The following code, included as Part A in the Computer Program Listing Appendix, shows how to add the context to the request context.

```
void Client_FunctionalInterceptor::send_request
(PortableInterceptor::ClientRequestInfo& ri)
{
  const string &category = Client::getCategory( );
  IOP_ServiceContext sc;
  CORBA_BOA::initialize_category_context(category, sc);
  CORBA_Boolean replace = CORBA_FALSE;
  ri.add_request_service_context(sc, replace);
}
```

The BOE includes an object oriented database for managing the platform, the Central Management Server (CMS). Integration with the CMS may be as follows. The cluster object for the CMS contains the definitions for the categories. This information will be sent using the server intelligence implementation to servers around the cluster when changed.

```
SI_TENANTS
  SI_CATEGORIES
    [0]
      SI_CATEGORY      "premium"
      SI_WEIGHT        3.0
    [1]
      SI_CATEGORY      "discount"
      SI_WEIGHT        1.0
    SI_DEFAULT         "discount"
```

There is a new CMS console command called "tenants". The arguments are a list of <category name> <weight> pairs. If no elements are specified the tenant model is turned off. For example, to create a tenants map as shown previously, user:

tenants discount 1 premium 3

The user object contains a property specifying the user's category.

SI_TENANT_CATEGORY "discount"

The CMS is the only server that will verify that the category in the context matches the category in the user object. The CMS will return the users category to the BOE Software Development Kit (SDK) in the logon bag. The SDK will use that to set the category for calls to all servers. This ensures that non-CMS servers get the correct category.

Example 2

In order to evaluate the properties of various embodiments, various tests were performed. In each test, a series of requests of differing priority categories (for example Discount, Standard, Premium) were randomly generated.

The table of FIG. 7 presents statistics on the performance of the various queue models Q1-4. In FIG. 7, Q1 represents a conventional FIFO queue model; Q2 represents a queue model of the first embodiment; Q3 represents a queue model of the second embodiment; and Q4 represents a queue model of the third embodiment.

In the table of FIG. 7, the "Generated" column is the percentage of requests in each category. The "Time" column indicates that the requests will take a random amount of time between zero and the value in the column. The "Requested" column contains the percentage of time to be spent processing requests in the given category. The Q<x> column contains the actual time spent processing requests.

Some observations of the results of the table of FIG. 7 are noted. For example Q1 is a FIFO queue, so the time spent roughly matches the "Generated" columns because the FIFO queue make no use of the "Requested" percentages.

It is observed that the queue model Q2 works for the cases where all requests take the same amount of time. Thus for the tests (Test 1 and Test 2) where the "Time" column contains the same amount for all categories, the Q2 column values roughly match the "Requested" percentages. However, for other tests where the time for requests in each category are not the same, lower performance for the queue model Q2 is observed.

It is noted from FIG. 7 that the queue model Q3 improves performance by accounting for the time spent processing requests. This can be seen where the Q3 actual percentages are close to the requested percentages for all cases.

The "Test 6" is semi-saturated. Accordingly, for the queue model Q3 the requests weight converted to a percentage is $(50/(50+15))=0.77$. That matches the actual percentage column.

The queue model Q4 offers still a further improvement. Specifically, FIG. 7A shows that the actual percentages converge much faster to the requested percentages that in the queue model Q3. This reflects the improvement offered by accounting for the error.

FIG. 8 illustrates hardware of a special purpose computing machine. This computing machine may be configured to implement queue resource allocation in accordance with particular embodiments.

In particular, computer system 800 comprises a processor 802 that is in electronic communication with a non-transitory computer-readable storage medium 803. This computer-readable storage medium has stored thereon code 805 corresponding to the queuing procedure. Code 804 corresponds to code instructing threads in the server to pull requests off of the queue and process them. Code may be configured to reference data stored in a database of a non-transitory computer-readable storage medium, for example as may be located in a remote database server.

FIG. 8A illustrates an overview of the elements of an embodiment of a queue system 850 according to an embodiment. Client(s) 852 send requests 854 to the server 856. The requests are put in the queue 858 according to the queuing procedure. Threads 860 in the server pull requests off the queue and process them.

Embodiments of query visualization and optimization may be run in conjunction with a computer system which may comprise a software server. A number of software servers together may form a cluster, or logical network of computer systems programmed with software programs that communicate with each other and work together to process requests.

Figure 9:
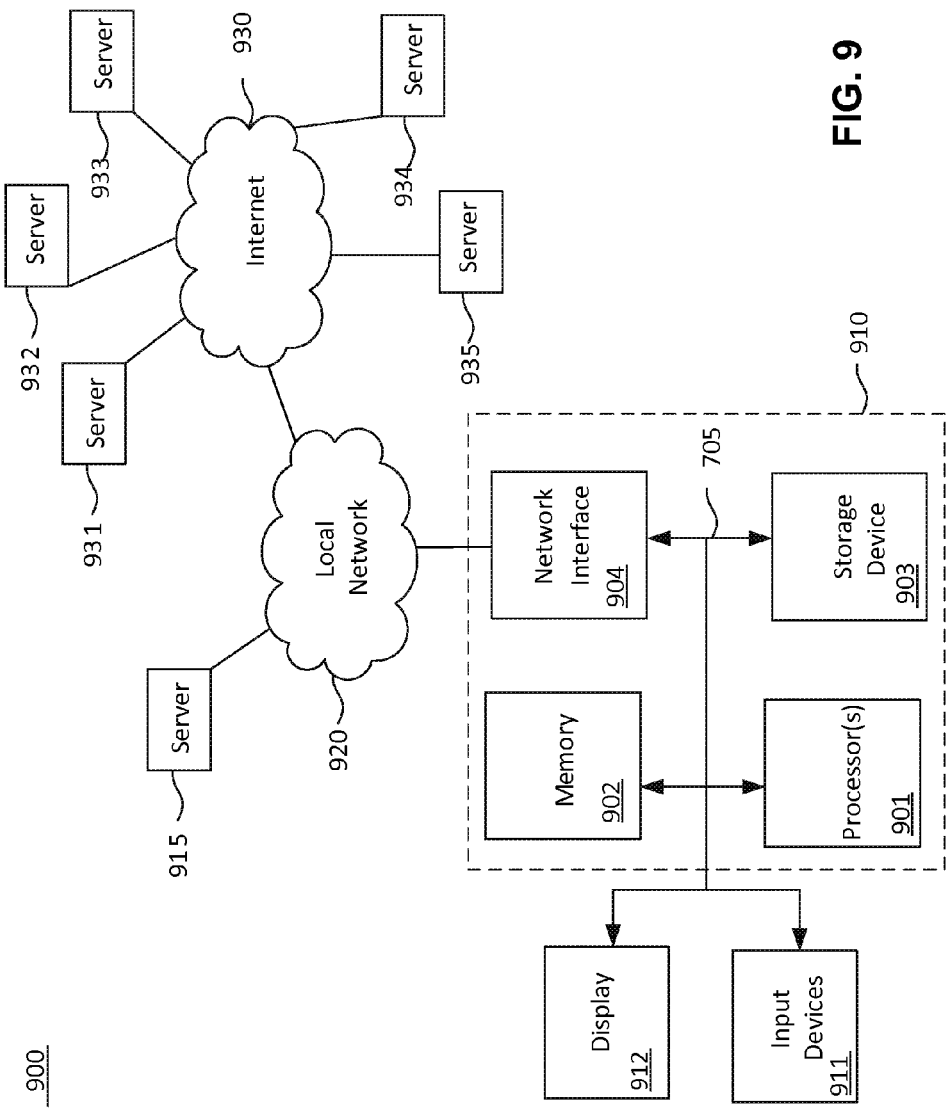
FIG. 9 illustrates an example of a computer system.

An example computer system 910 is illustrated in FIG. 9. Computer system 910 includes a bus 905 or other communication mechanism for communicating information, and a processor 901 coupled with bus 905 for processing information.

Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both.

A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques above, for example. Storage device and memory are both examples of computer readable media. The computer system generally described in FIG. 9 includes at least those attributes described in FIG. 8.

Computer system 910 may be coupled via bus 905 to a display 912, such as a cathode ray tube (CRT) or liquid crystal display (LCD), for displaying information to a computer user. An input device 911 such as a touch screen, is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be for Broadband Wireless Access (BWA) technologies. In any such implementation, network interface 904 sends and receives electrical, electromagnetic, or optical signals that carry digital data streams representing various types of information.

Computer system 910 can send and receive information, including messages or other interface actions, through the network interface 904 across a local network 920, an Intranet, or the Internet 930. For a local network, computer system 910 may communicate with a plurality of other computer machines, such as server 915. Accordingly, computer system 910 and server computer systems represented by server 915 may form a cloud computing network, which may be programmed with processes described herein.

In an example involving the Internet, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing a server configured to receive a plurality of requests;
providing a first category map specifying a first allocation between a first priority type, a second priority type, and a third priority type in a saturated condition wherein the server receives requests of the first priority type, the second priority type, and the third priority type;
providing a second category map specifying a second allocation between the first priority type and the second priority type in a semi-saturated condition wherein the server receives requests of the first priority type and the second priority type, but not of the third priority type;
receiving at the server a first request of the first priority type in the semi-saturated condition;
receiving at the server a second request of the second priority type in the semi-saturated condition;
scaling a slot size based upon an estimated time of processing a request of the first priority type, wherein the estimated time is based upon an actual processing time of a previous request of the first priority type only that has been received by the server; and
causing the server to process the first request and the second request in an order according to a single queue created by a queuing procedure referencing the second category map based upon a desired percentage of output of the first priority type and of the second priority type over a plurality of requests, wherein the desired percentage is based upon a service level agreement, wherein the queuing procedure creates the single queue comprising a window comprising a first number of slots apportioned for processing requests of the first priority type, and comprising a second number of slots apportioned for processing requests of the second priority type.

2. The method of claim 1 further comprising:
calculating an error adjustment value derived from comparing an actual percentage of previous responses to the desired percentage,
wherein the scaling comprises adding the error adjustment value to the slot size.

3. The method of claim 1 wherein the plurality of requests approaches infinity.

4. The method of claim 1 wherein the estimated time is based upon a plurality of actual processing times of a plurality previous requests of the first type.

5. A non-transitory computer readable storage medium embodying a computer program for performing a method, said method comprising:
providing a server configured to receive a plurality of requests;
providing a first category map specifying a first allocation between a first priority type, a second priority type, and a third priority type in a saturated condition wherein the server receives requests of the first priority type, the second priority type, and the third priority type;
providing a second category map specifying a second allocation between the first priority type and the second priority type in a semi-saturated condition wherein the server receives requests of the first priority type and the second priority type, but not of the third priority type;
causing the server to receive a first request of the first priority type in the semi-saturated condition;
causing the server to receive a second request of the second priority type in the semi-saturated condition;
scaling a slot size based upon an estimated time of processing a request of the first priority type, wherein the estimated time is based upon an actual processing time of a previous request of the first priority type only that has been received by the server; and
causing the server to process the first request and the second request in an order according to a single queue created by a queuing procedure referencing the second category map based upon a desired percentage of output of the first priority type and of the second priority type over a plurality of requests, wherein the desired percentage is based upon a service level agreement, wherein the queuing procedure creates the single queue comprising a window comprising a first number of slots apportioned for processing requests of the first priority type, and comprising a second number of slots apportioned for processing requests of the second priority type.

6. The non-transitory computer readable storage medium of claim 5 wherein the method further comprises:
calculating an error adjustment value derived from comparing an actual percentage of previous responses to the desired percentage,
wherein the scaling comprises adding the error adjustment value to the slot size.

7. The non-transitory computer readable storage medium of claim 5 wherein the plurality of requests approaches infinity.

8. The non-transitory computer readable storage medium of claim 5 wherein the estimated time is based upon a plurality of actual processing times of a plurality previous requests of the first type.

9. A computer system comprising:
one or more hardware processors;
a software program, executable on said computer system, the software program configured to:
provide a hardware server configured to receive a plurality of requests;
provide a first category map specifying a first allocation between a first priority type, a second priority type, and a third priority type in a saturated condition wherein the hardware server receives requests of the first priority type, the second priority type, and the third priority type;
providing a second category map specifying a second allocation between the first priority type and the second priority type in a semi-saturated condition wherein the hardware server receives requests of the first priority type and the second priority type, but not of the third priority type;
cause the hardware server to receive the first request of a first priority type in the semi-saturated condition;
cause the hardware server to receive the second request of a second priority type in the semi-saturated condition;
scaling a slot size based upon an estimated time of processing a request of the first priority type, wherein the estimated time is based upon an actual processing time of a previous
request of the first priority type only that has been received by the server; and
cause the server to process the first request and the second request in an order according to a single queue created by a queuing procedure referencing the second category map based upon a desired percentage of output of the first priority type and of the second priority type over a plurality of requests, wherein the desired percentage is based upon a service level agreement, wherein the queuing procedure creates the single queue comprising a window comprising a first number of slots apportioned for processing requests of the first priority type, and comprising a second number of slots apportioned for processing requests of the second priority type.

10. The computer system of claim 9 wherein the software program is further configured to:

calculate an error adjustment value derived from comparing an actual percentage of previous responses to the desired percentage, wherein the scaling comprises adding the error adjustment value to the slot size.

11. The computer system of claim 9 wherein the plurality of requests approaches infinity.

12. The computer system of claim 9 wherein the estimated time is based upon a plurality of actual processing times of a plurality previous requests of the first type.

* * * * *